United States Patent
Gray et al.

(10) Patent No.: US 7,472,485 B2
(45) Date of Patent: Jan. 6, 2009

(54) TURNTABLE FOR WHEEL ALIGNMENT (75) Inventors: Brian Gray, Conway, AR (US); Ronald D. Swayne, Sherwood, AR (US); Matthew T. Foreman, Greenbrier, AR (US); Donald A. Healy, Conway, AR (US); James L. Dale, Jr., Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 180 days.

(21) Appl. No.: 11/298,943

(22) Filed: Dec. 12, 2005

(65) Prior Publication Data
US 2007/0130784 A1 Jun. 14, 2007

(51) Int. Cl.
G01B 5/24 (2006.01)
B66F 7/28 (2006.01)

(52) U.S. Cl. .................. 33/203.14; 33/203; 33/203.12; 187/216

(58) Field of Classification Search .............. 33/203, 33/203.12, 203.14, 203.15; 187/203, 216–220
See application file for complete search history.

(56) References Cited

U.S. PATENT DOCUMENTS

| 1,989,307 | A |   | 1/1935  | Bennett       |           |
|-----------|---|---|---------|---------------|-----------|
| 2,087,909 | A | * | 7/1937  | Haucke        | 33/203.12 |
| 2,125,534 | A |   | 8/1938  | Wochner       |           |
| 2,135,195 | A |   | 11/1938 | Morse et al.  |           |
| 2,155,541 | A |   | 4/1939  | Graham et al. |           |
| 2,160,226 | A |   | 5/1939  | Phillips      |           |
| 2,197,468 | A |   | 4/1940  | Graham et al. |           |
| 2,208,063 | A |   | 7/1940  | Wochner       |           |
| 2,250,742 | A |   | 7/1941  | Bennett       |           |
| 2,503,580 | A |   | 4/1950  | Fontaine      |           |

(Continued)

FOREIGN PATENT DOCUMENTS

DE    1 473 773 A1    1/1969

(Continued)

OTHER PUBLICATIONS

International Search Report and Written Opinion of the International Searching Authority issued in International Application No. PCT/US2006/037117, dated Apr. 16, 2007.

Primary Examiner—G. Bradley Bennett
Assistant Examiner—Amy Cohen Johnson
(74) Attorney, Agent, or Firm—McDermott Will & Emery LLP (57) ABSTRACT

An improved wheel alignment turntable for supporting a wheel of a vehicle. Embodiments include a turntable having a base, and a top plate for receiving the vehicle wheel, the top plate being mounted to an upper surface of the base for rotational and translational movement relative to the base. A pair of paddles, removably adjustably attachable to the base, engages a peripheral wall of the top plate for maintaining the top plate in a predetermined position relative to the base while the vehicle wheel is being positioned on the turntable. The paddles are easily removable when the wheel is supported on the turntable. A plurality of slide pads are removably mounted to a lower surface of the base, for enabling sliding motion between the turntable and a surface of a lift without damaging paint on the surface of the lift. The slide pads are stackable against one another for adjusting height of the turntable relative to the lift.

20 Claims, 7 Drawing Sheets

U.S. PATENT DOCUMENTS

| | | | |
|---|---|---|---|
| 2,648,139 A * | 8/1953 | Wilkerson | 33/203 |
| 2,736,104 A * | 2/1956 | Sherman | 33/203.12 |
| 2,987,826 A | 6/1961 | Wilkerson | |
| 3,143,810 A | 8/1964 | McClendon | |
| 3,161,965 A * | 12/1964 | Taylor | 33/203 |
| 3,164,910 A * | 1/1965 | Manlove | 33/203.18 |
| 3,181,248 A | 5/1965 | Manlove | |
| 3,231,983 A | 2/1966 | Bender | |
| 3,539,036 A * | 11/1970 | Halstead | 187/220 |
| 4,029,369 A | 6/1977 | Hunter et al. | |
| 4,063,364 A * | 12/1977 | MacMillan | 33/203.14 |
| 4,167,816 A | 9/1979 | Jarman | |
| 4,280,280 A | 7/1981 | Eck et al. | |
| 4,430,802 A * | 2/1984 | Cole | 33/203.12 |
| 4,480,389 A | 11/1984 | Capovilla | |
| 4,617,720 A | 10/1986 | Palfery et al. | |
| 4,897,926 A | 2/1990 | Altnether et al. | |
| 4,924,591 A | 5/1990 | Brodu | |
| 6,047,594 A | 4/2000 | Kroll et al. | |
| 6,209,209 B1 * | 4/2001 | Linson et al. | 33/203.12 |
| 6,317,992 B1 | 11/2001 | Lin | |
| 6,564,461 B1 * | 5/2003 | Naruse | 33/203 |
| 7,143,519 B2 * | 12/2006 | Jackson | 33/203.12 |
| 7,308,971 B2 * | 12/2007 | Liebetreu et al. | 187/216 |
| 2005/0133309 A1 | 6/2005 | Liebetreu et al. | |

FOREIGN PATENT DOCUMENTS

| | | |
|---|---|---|
| DE | 28 38 399 A1 | 3/1980 |
| DE | 35 44 193 A1 | 6/1986 |
| FR | 1 600 238 | 7/1970 |
| FR | 2 438 265 | 4/1980 |
| FR | 2 701 442 A1 | 8/1994 |
| GB | 2083634 A * | 3/1982 |

* cited by examiner

TURNTABLE FOR WHEEL ALIGNMENT

TECHNICAL FIELD

The present disclosure relates to a turntable that allows the wheels of a vehicle to be turned when the vehicle is on the turntable. The disclosure has particular applicability to the field of automotive wheel alignment.

BACKGROUND ART

Turn plates, also called turntables, are known devices for allowing the wheels of a vehicle to be turned when the vehicle has been loaded onto a lift for aligning the wheels of the vehicle. Turntables are typically made to fit within the "saddle" of a conventional automotive lift, which typically has a U-shaped cross section. Disadvantageously, prior art turntables often scratch and damage the painted surfaces of the lift when they are positioned on the lift. Furthermore, different lift manufacturers make lifts having different saddle depths, which require turntables of correspondingly different overall heights to be compatible with these lifts.

Turntables typically have a top which is rotatable and translatable relative to a base, to accommodate vehicles of varying widths such that the vehicle wheel is centered on the turntable. Prior art turntables use locking pins to fix the turntable top to the base prior to loading the vehicle onto the turntable. These pins cause problems insofar as they are often difficult to access and remove during the subsequent alignment procedure, because the vehicle wheel is often located on the pins. Also, the pin can be damaged by the wheel if the wheel runs over the pin while the wheel is being loaded on the turntable.

There exists a need for a turntable that does not damage the surface of a lift, and whose height is adjustable to accommodate lifts of varying saddle depths. There also exists a need for a turntable that can be centered and locked in position prior to loading a vehicle wheel, and easily unlocked after the wheel is loaded onto the turntable.

SUMMARY OF THE DISCLOSURE

An advantage of the present disclosure is a turntable whose height is easily adjusted via low-friction pads, which also prevent damage to the paint on the surface of a lift.

A further advantage of the disclosure is a turntable that can be centered and locked using a locking device that does not contact the wheel-receiving surface of the turntable top, and thus can be easily removed after the vehicle wheel is loaded onto the turntable.

Additional advantages and other features of the disclosure will be set forth in part in the description which follows and in part will become apparent to those having ordinary skill in the art upon examination of the following or may be learned from the practice of the disclosure. The advantages of the disclosure may be realized and obtained as particularly pointed out in the appended claims.

According to the present disclosure, the foregoing and other advantages are achieved in part by a turntable for supporting a wheel of a vehicle, the turntable comprising a base and a top plate for receiving the vehicle wheel. The top plate is mounted to an upper surface of the base for rotational and translational movement relative to the base. A pair of paddles, removably adjustably attachable to the base, engage a peripheral wall of the top plate for maintaining the top plate in a predetermined position relative to the base while the vehicle wheel is being positioned on the turntable, and the paddles are removable when the wheel is supported on the turntable.

Another aspect of the present disclosure is a turntable comprising a base and a top plate for receiving a vehicle wheel, the top plate being mounted to an upper surface of the base for rotational and translational movement relative to the base, and a plurality of slide pads removably mounted to a lower surface of the base, for enabling sliding motion between the turntable and a surface of a lift without damaging paint on the surface of the lift. The slide pads are stackable against one another for adjusting a height of the turntable relative to the lift.

Additional advantages of the present disclosure will become readily apparent to those skilled in this art from the following detailed description, wherein only selected embodiments are shown and described, simply by way of illustration of the best mode contemplated for carrying out the disclosure. As will be realized, the disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION

Conventional wheel alignment turntables scratch and damage the painted surfaces of the lift when they are moved, and are not easily adaptable to lifts of varying saddle depths. Further, conventional turntables use locking pins to fix the turntable top to the base when a vehicle is being driven on to the turntable. The locking pins are often difficult to access and remove during alignment, due to their proximity to the vehicle tire. Moreover, the pins can be damaged if they are run over by the vehicle.

The present disclosure addresses these and other problems of prior art turntables by providing a turntable with relatively thin stackable slide pads that are selectively attachable to the bottom of the turntable, as by screws. The slide pads are made of a material having a low coefficient of friction, such as ABS plastic. The slide pads are stacked as necessary to adjust the overall height of the inventive turntable to compensate for variations in lift saddle depth between lift manufacturers.

The present disclosure also provides a pair of removable paddles attachable to the base of a turntable, which engage an outer peripheral wall of the movable turntable top plate fore and aft of the vehicle wheel, to position and lock the top plate while the vehicle wheel is being positioned on the turntable. Because the paddles do not engage the upper (i.e., wheel receiving) surface of the top plate, they do not interfere with loading the vehicle on the turntable, and the wheel does not contact them when the wheel is positioned on the turntable. Thus, the paddles can be easily removed after positioning the vehicle to allow the vehicle wheel to be rotated and translated without restriction during the alignment process.

Figure 1:
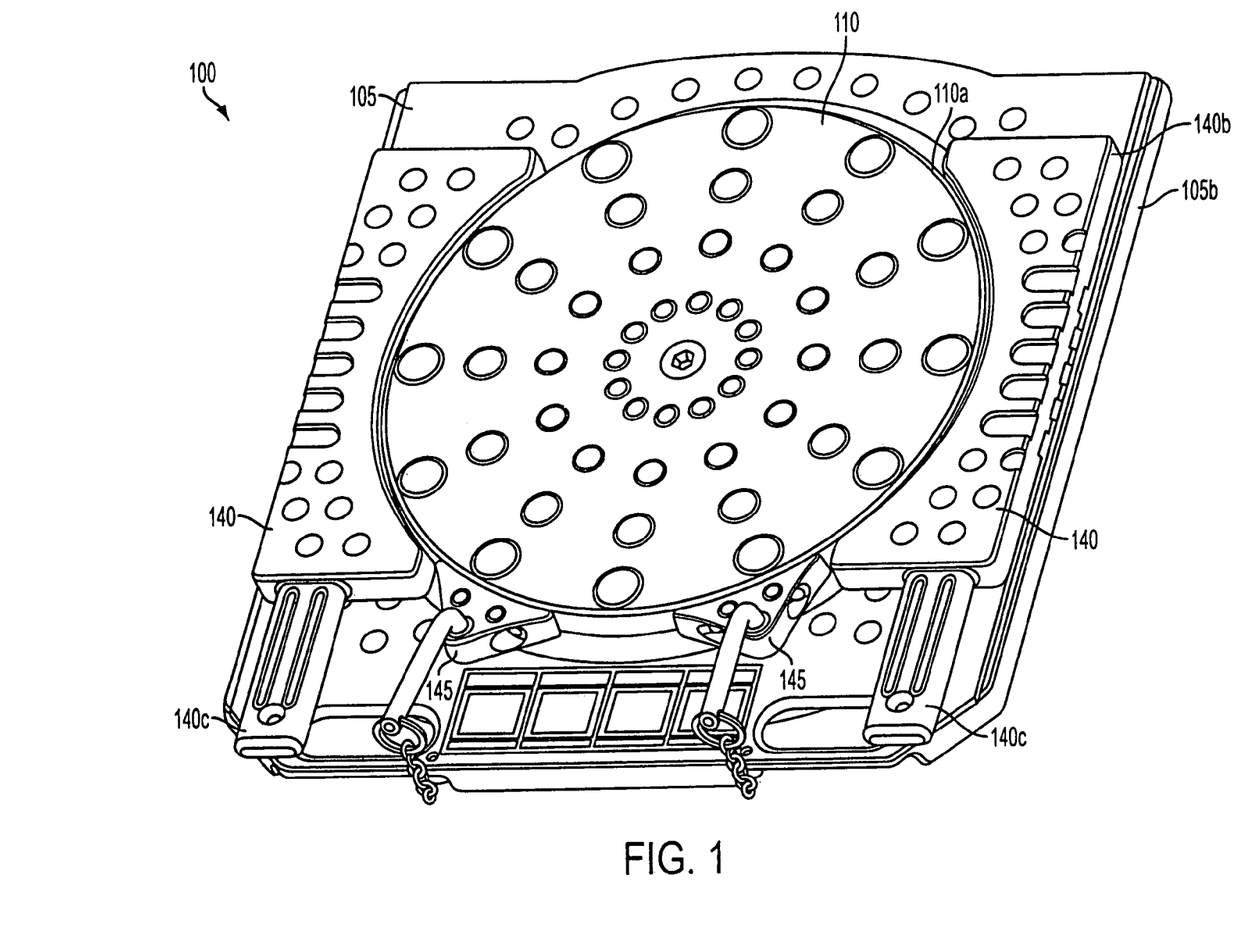
FIG. 1 is a top perspective view of a turntable in accordance with an embodiment of the disclosure.
Figure 2:
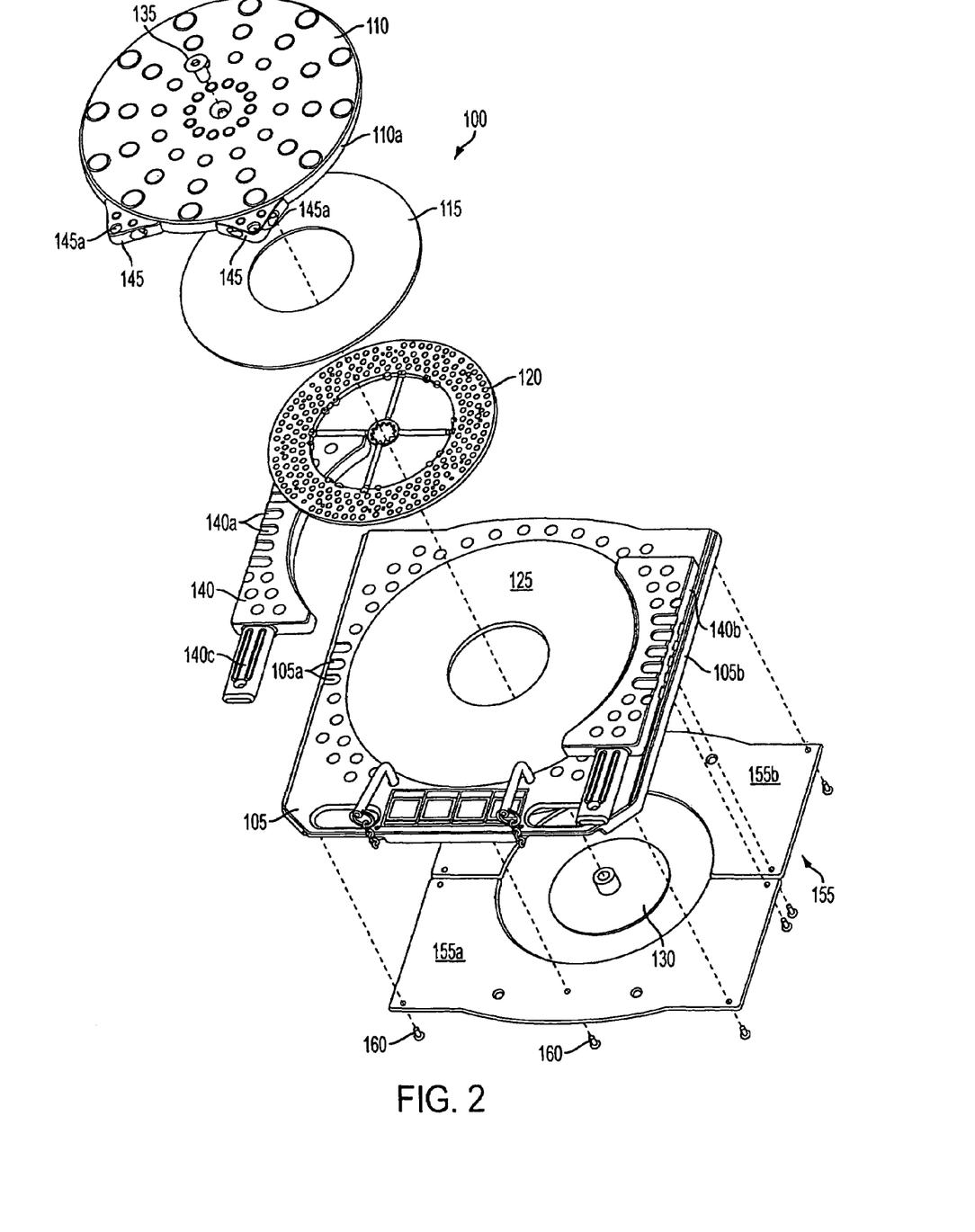
FIG. 2 is a top exploded view of the turntable of FIG. 1.
Figure 3:
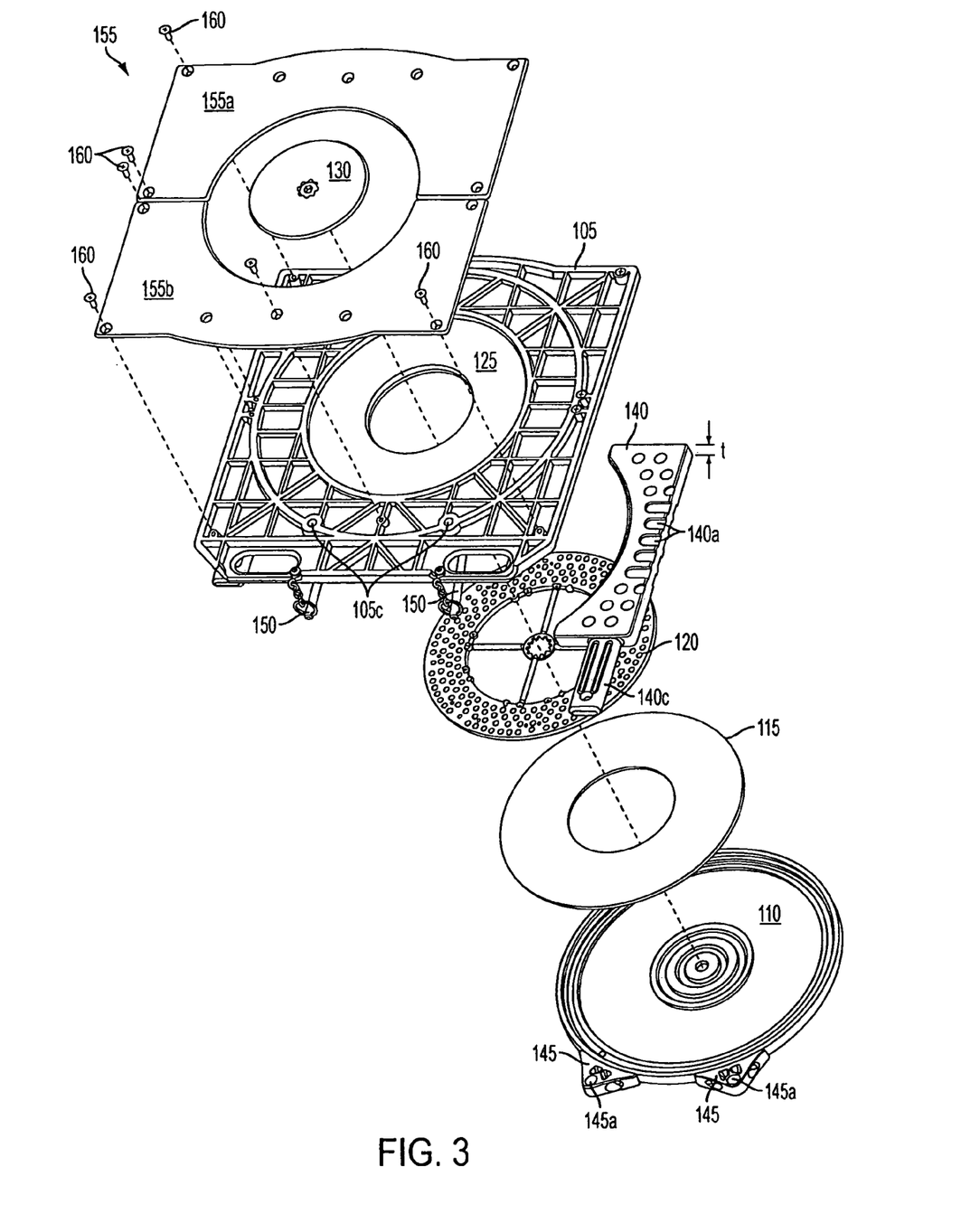
FIG. 3 is a bottom exploded view of the turntable of FIG. 1.

A turntable according to an embodiment of the disclosure will now be described with reference to FIGS. 1-5B. A turntable 100 for supporting a wheel of a vehicle (not shown) comprises a metal base 105, such as a cast aluminum base, and a top plate 110 for receiving the vehicle wheel. Top plate 110 is mounted to base 105 in a conventional manner for rotational and translational movement relative to base 105. Such a mounting arrangement is shown in FIGS. 2 and 3, wherein the top surface of an upper wear plate 115 contacts the underside of top plate 110, and the bottom surface of wear plate 115 contacts one side of a ball plate 120 having a plurality of ball bearings. The other side of ball plate 120 contacts the top surface of a lower wear plate 125, whose bottom surface contacts base 105. The assembly is held together by a plate 130 having a shaft that extends upward through base 105, lower wear plate 125, ball plate 120, upper wear plate 115 and top plate 110, and is secured by a screw 135. The ball plate 120 and large central holes of the wear plates and base 110 enable rotational and translational movement of top plate 110.

A pair of paddles 140 are removably and adjustably attachable to base 105, for engaging the peripheral wall 110a of top plate 110 for maintaining top plate 110 in a predetermined position relative to base 105 while the vehicle wheel is being positioned; e.g., driven, onto turntable 100. Paddles 140 are removable after the vehicle wheel is positioned on turntable 100. Paddles 140 are made of a plastic material, such as polyurethane, and have a handle 140c for facilitating removal from base 105 when the vehicle wheel is supported on turntable 100.

Paddles 140 attach to opposing sides of base 105, and are located and retained on base 105 by a plurality of first engaging members 105a, such as a plurality of equally-spaced raised protrusions, at each of the opposing sides of base 105, which engage with a plurality of corresponding second engaging members 140a, such as equally-spaced pockets, in paddles 140. Since there are more pockets 140a in paddles 140 than there are protrusions 105a in base 105, paddles 140 can be positioned on base 105 in a plurality of different positions, thereby allowing the position of top plate 110 relative to base 105 to be adjusted.

The base 105 of turntable 100 is for mounting to the saddles 210 of a conventional automotive lift 200 (see FIGS. 5A and 5B), and paddles 140 are for adjusting top plate 110 in the directions of arrows A to a position relative to a central longitudinal axis C of lift 200, and for maintaining that position. In this way, the inventive turntable can be positioned to accommodate vehicles of different tracks, such as narrow vehicles, so their wheels are properly centered on top plate 110. In certain embodiments of the disclosure, top plate 110 can be adjusted 25 mm from either side of the center of turntable 100.

Figure 5A:
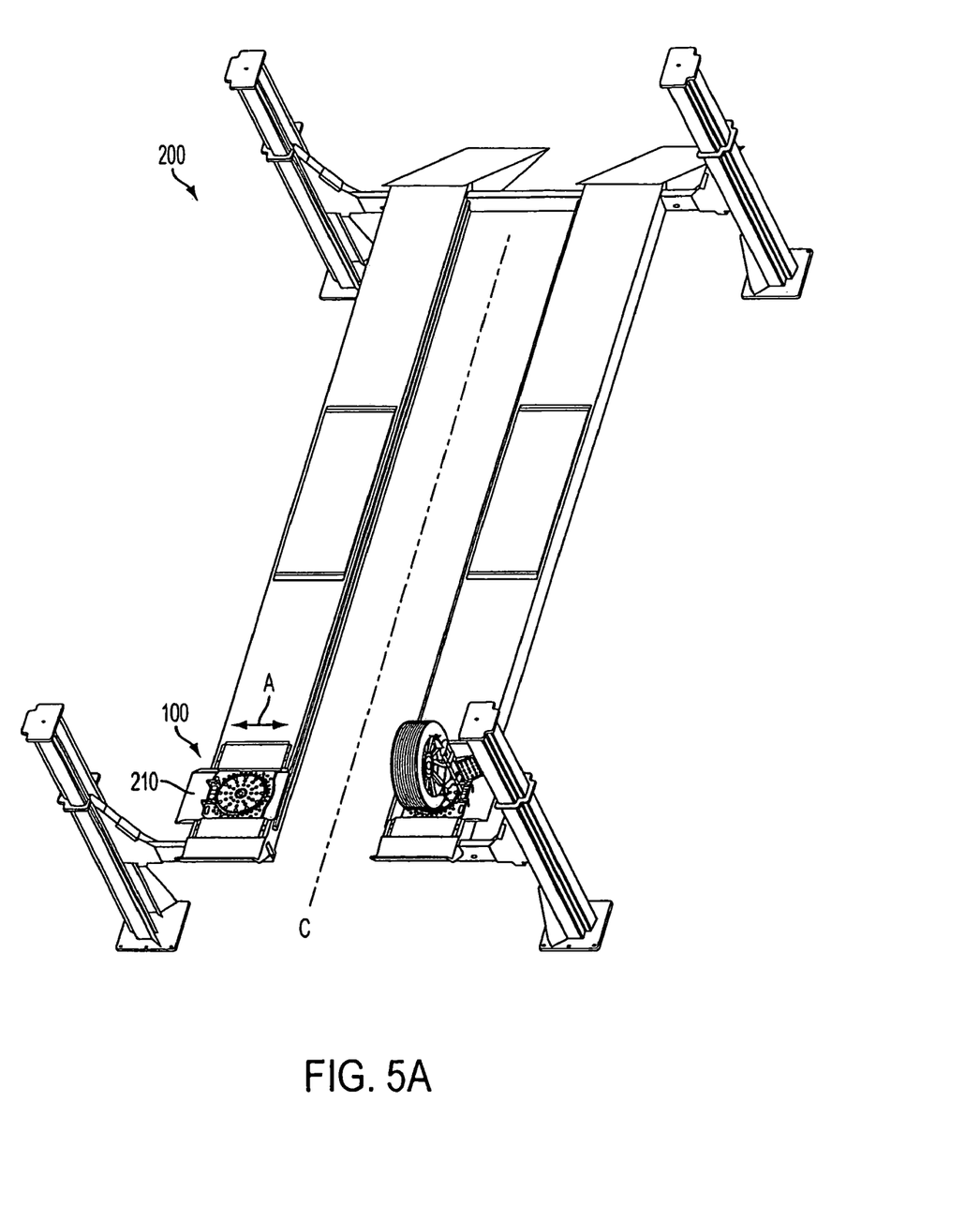
FIG. 5A is perspective view of an automotive lift with a turntable according to an embodiment of the disclosure mounted thereto.
Figure 5B:
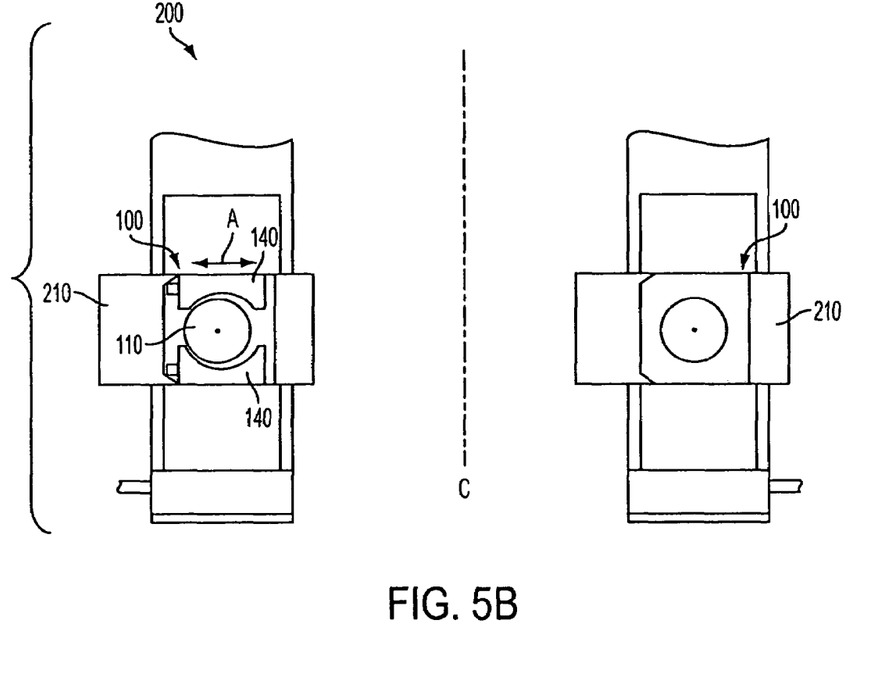
FIG. 5B is a partial top view of the lift of FIG. 5A.

As shown in FIG. 5B, paddles 140 are attachable to base 105 such that paddles 140 are located fore and aft of the wheel when turntable 100 is installed on lift 200 and when the wheel is supported on turntable 100. As shown in FIG. 3, paddles 140 have a thickness t such that a top surface of each paddle 140 is substantially coplanar with a top surface of top plate 110 when they are attached to base 105. Further, paddles 140 are configured such that an outer edge 140b of each paddle 140 substantially aligns with an outer edge 105b of base 105 when they are attached to base 105. Paddles 140 thus act as spacers to smooth the path of the vehicle wheel as it is rolled onto turntable 100. After the vehicle wheel is positioned on top plate 110, paddles 140 can be easily removed, enabling the wheel to be rotated and translated without restriction.

The top plate 110 further comprises a pair of removable locking ears 145 on its peripheral wall 110a. Each ear 145 has a through hole 145a which is alignable with a hole 105c in base 105. Conventional locking pins 150 engage respective through holes 145a of locking ears 145 and the holes 105c in base 105 to lock top plate 110 to base 105. Locking ears 145 can be removed by the user, if desired, to provide translation of top plate 110 without restriction or interference.

Figure 4:
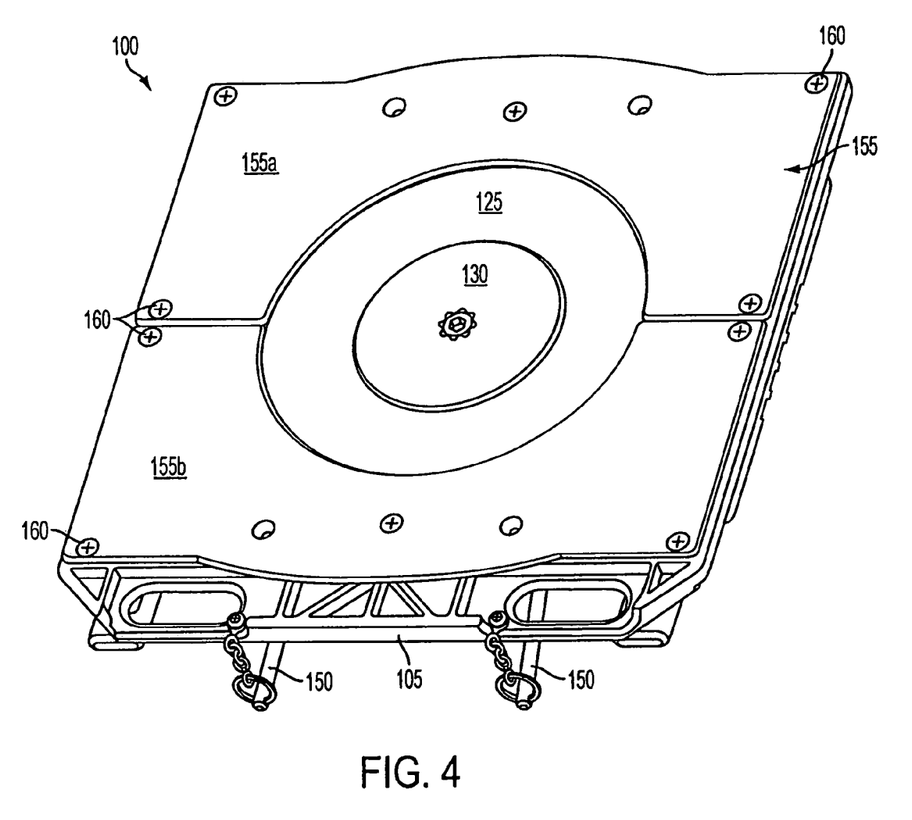
FIG. 4 is a bottom perspective view of the turntable of FIG. 1.

Turntable 100 further includes a slide pad 155, removably mounted to a lower surface of base 105 using screws 160, for enabling sliding motion between turntable 100 and a surface of a lift, such as saddle 210 of lift 200, without damaging the paint on the surface of the lift. Slide pad 155 can be injection-molded from a material having a relatively low coefficient of friction, such as ABS plastic, Nylon® or Delrin® polymers. Such materials are suitable because they are inexpensive, readily available, and easily injection-molded. Slide pad 155 has a thickness of, for example, about 5 mm. In another embodiment, slide pad 155 has a thickness of about 3.5 mm. Slide pad 155 can comprise a plurality of pieces 155a, 155b separately attachable to base 105.

Figure 6A:
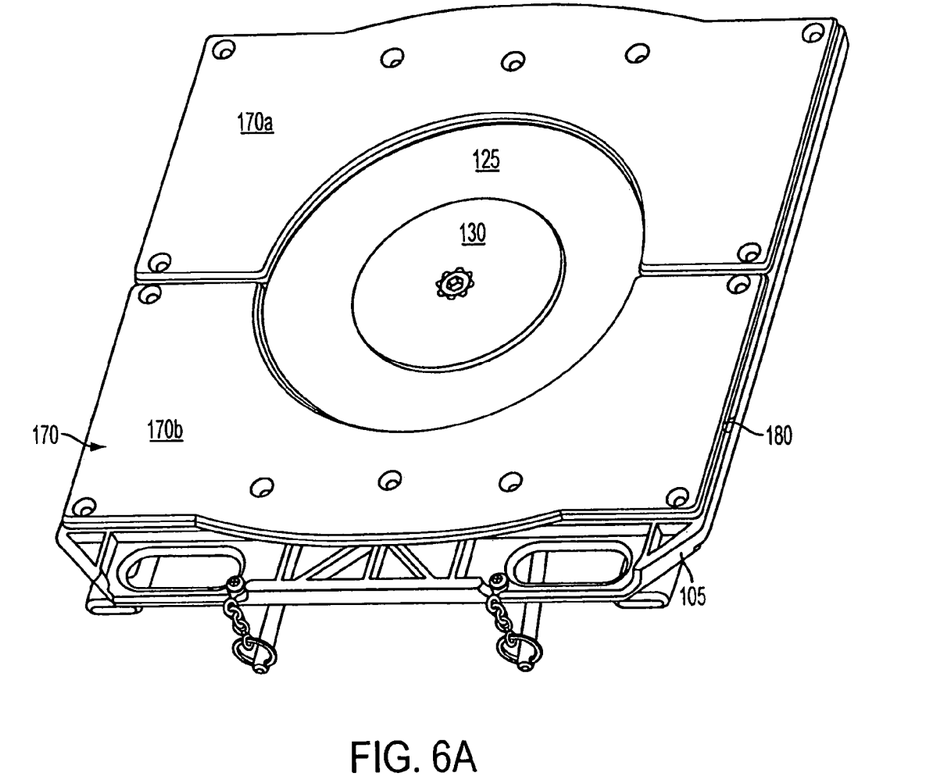
FIG. 6A is a bottom perspective view of a turntable in accordance with another embodiment of the disclosure.
Figure 6B:
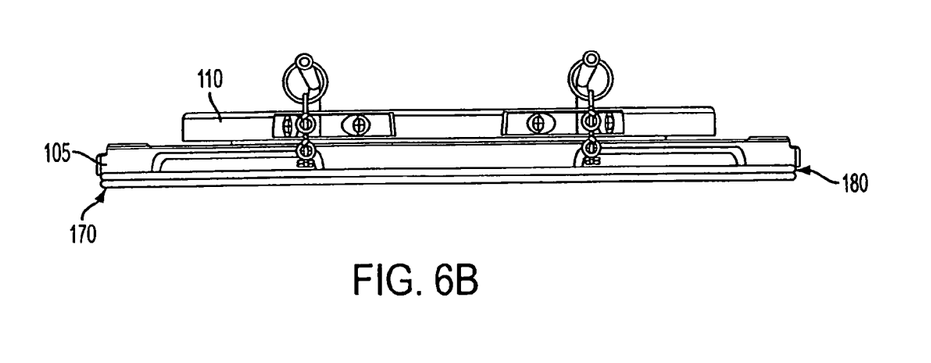
FIG. 6B is a side view of the turntable of FIG. 6A.

In a further embodiment shown in FIGS. 6A and 6B, a plurality of slide pads 170, 180 are stacked against one another for adjusting a height of turntable 100 relative to the lift saddle, such as saddle 210 of lift 200, thereby enabling the inventive turntable to be adaptable for use with lifts having different saddle depths. In certain embodiments, each of the slide pads 170, 180 comprises a plurality of pieces 170a and 170b, 180a and 180b, respectively, separately attachable to the base. Slide pads 170, 180 can be made of ABS plastic, Nylon® or Delrin® polymers, and have a thickness of, for example, about 5 mm or 3.5 mm each. Slide pads of different thicknesses can be stacked against one another as necessary to achieve the desired turntable height.

The use of paddles for positioning and locking top plate 110 eliminates the problems inherent with conventional locking pins, whose removal is inconvenient and sometimes impossible when they are blocked or damaged by the vehicle wheel. The paddles also enable top plate 110 to be positioned relative to the turntable center to ensure that the wheels of narrow vehicles can be properly centered on top plate 110.

The use of slide pads, and slide pads that can be stacked, in the disclosure enable easy positional adjustment of the turntable 100 on a lift, and prevents scratching of the lift. The slide pads also provide a height adjustment for turntable 100, to accommodate lifts of varying saddle depths.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the disclosure. However, it should be recognized that the present disclosure can be practiced without resorting to the details specifically set forth. In other instances, well known processing structures have not been described in detail, in order not to unnecessarily obscure the subject matter herein.

Only selected embodiments of the disclosure and but a few examples of its versatility are shown and described. It is to be understood that the disclosure is capable of use in various other combinations and environments and is capable of changes or modifications within the scope of the inventive concept as expressed herein.

What is claimed is:

1. A turntable for supporting a wheel of a vehicle, the turntable comprising:
    a base;
    a top plate for receiving the vehicle wheel, the top plate being mounted to an upper surface of the base for rotational and translational movement relative to the base; and
    a pair of paddles, separate from the top plate, removably adjustably attachable to the base for selectively engaging a peripheral wall of the top plate for maintaining the top plate in a predetermined position relative to the base while the vehicle wheel is being positioned on the turntable;
    wherein the paddles are removable from the base and from the top plate when the wheel is supported on the turntable.

2. The turntable of claim 1, wherein the paddles attach to the base on opposing sides of the base.

3. The turntable of claim 2, wherein the base has a plurality of first engaging members at each of the sides of the base, and the paddles each have a plurality of second engaging members engageable with the first engaging members in the base to locate and retain the paddles in the predetermined position.

4. The turntable of claim 3, wherein the first engaging members are raised protrusions on the base, and the second engaging members are pockets in the paddles.

5. The turntable of claim 2, wherein the paddles are attachable to the base such that the paddles are located fore and aft of the wheel when the wheel is supported on the turntable, and the paddles have a thickness such that a top surface of each paddle is substantially coplanar with a top surface of the top plate when the paddles are attached to the base.

6. The turntable of claim 5, wherein the paddles are configured such that an outer edge of each paddle substantially aligns with an outer edge of the base when the paddles are attached to the base.

7. The turntable of claim 6, wherein the paddles comprise polyurethane, and the base comprises aluminum.

8. The turntable of claim 2, wherein the base is for mounting to a lift, and the paddles are for maintaining the top plate in a position relative to a central longitudinal axis of the lift.

9. The turntable of claim 1, wherein each paddle comprises a handle for facilitating removal of the paddle from the base when the wheel is supported on the turntable.

10. The turntable of claim 1, further comprising a slide pad mounted to a lower surface of the base for enabling sliding motion between the turntable and a surface of a lift without damaging paint on the surface of the lift.

11. The turntable of claim 10, further comprising a plurality of the slide pads, stacked against one another, mounted to the lower surface of the base for adjusting a height of the turntable.

12. The turntable of claim 11, wherein one of the slide pads has a thickness of about 5 mm.

13. The turntable of claim 11, wherein one of the slide pads has a thickness of about 3.5 mm.

14. The turntable of claim 10, wherein the slide pad comprises one of ABS, Nylon® or Delrin®.

15. A turntable for supporting a wheel of a vehicle, the turntable comprising:
    a base;
    a top plate for receiving the vehicle wheel, the top plate being mounted to an upper surface of the base for rotational and translational movement relative to the base; and
    a plurality of slide pads, removably mounted to a lower surface of the base, for enabling sliding motion between the turntable and a surface of a lift without damaging paint on the surface of the lift;
    wherein the slide pads are stackable against one another for adjusting a height of the turntable relative to the lift.

16. The turntable of claim 15, wherein the slide pads comprise one of ABS, Nylon® or Delrin®.

17. The turntable of claim 16, wherein one of the slide pads has a thickness of about 5 mm.

18. The turntable of claim 16, wherein one of the slide pads has a thickness of about 3.5 mm.

19. The turntable of claim 15, wherein each of the slide pads comprises a plurality of pieces separately attachable to the base.

20. A turntable for supporting a wheel of a vehicle, the turntable comprising:
    a base;
    a top plate for receiving the vehicle wheel, the top plate being mounted to an upper surface of the base for rotational and translational movement relative to the base, the top plate having a peripheral wall;
    a removably attachable locking ear for selectively engaging the peripheral wall of the top plate; and
    a lock to substantially prevent relative movement between the top plate and the base.

* * * * *